United States Patent
Haehner

(10) Patent No.: US 9,032,776 B2
(45) Date of Patent: May 19, 2015

(54) METHOD FOR CALIBRATING A TORSION TORQUEMETER

(75) Inventor: Edgar Haehner, Bordes (FR)

(73) Assignee: TURBOMECA, Bordes (FR)

( * ) Notice: Subject to any disclaimer, the term of this patent is extended or adjusted under 35 U.S.C. 154(b) by 0 days.

(21) Appl. No.: 14/001,726

(22) PCT Filed: Feb. 23, 2012

(86) PCT No.: PCT/FR2012/050383
§ 371 (c)(1),
(2), (4) Date: Aug. 27, 2013

(87) PCT Pub. No.: WO2012/117187
PCT Pub. Date: Sep. 7, 2012

(65) Prior Publication Data
US 2013/0327119 A1  Dec. 12, 2013

(30) Foreign Application Priority Data
Mar. 2, 2011  (FR) ..................................... 11 51682

(51) Int. Cl.
 G01L 25/00 (2006.01)
 G01L 3/02 (2006.01)
 G01L 3/10 (2006.01)

(52) U.S. Cl.
 CPC ............... *G01L 25/003* (2013.01); *G01L 3/104* (2013.01)

(58) Field of Classification Search
 CPC .... B25B 23/1425; B25B 13/463; B62D 6/10; G01L 5/0042; G01L 5/24; G01L 3/04; G01L 3/10
 USPC .......... 73/1.09, 1.11, 862.23–862.24, 862.26, 73/862.321, 862.325–862.326, 73/862.328–862.329
 See application file for complete search history.

(56) References Cited

U.S. PATENT DOCUMENTS

| | | | |
|---|---|---|---|
| 5,182,953 A | | 2/1993 | Ellinger et al. |
| 2011/0056309 A1* | | 3/2011 | Cazaux et al. ........... 73/862.325 |

FOREIGN PATENT DOCUMENTS

| | | |
|---|---|---|
| EP | 0 517 592 | 12/1992 |
| WO | 2009 141261 | 11/2009 |

OTHER PUBLICATIONS

International Search Report Issued May 9, 2012 in PCT/FR12/050383 filed Feb. 23, 2012.

* cited by examiner

*Primary Examiner* — Eric S McCall
*Assistant Examiner* — Anthony W Megna Fuentes
(74) *Attorney, Agent, or Firm* — Oblon, McClelland, Maier & Neustadt, L.L.P.

(57) ABSTRACT

A method for calibrating a torsion torquemeter including: placing a torsion torquemeter in a first state; performing first measurements determining first and second angular offsets, and measuring torque output by the power shaft using a reference torquemeter; placing the torsion torquemeter in a second state; performing second measurements determining the first and second angular offsets, and measuring torque output by the power shaft; placing the torquemeter in a third state; performing third measurements determining the first and second angular offsets, and measuring the torque output by the power shaft; placing the torquemeter in a fourth state; performing fourth measurements determining the first and second angular offsets, and measuring the torque output by the power shaft; calibrating the calculation unit based on the first, second, third, and fourth measurements.

9 Claims, 3 Drawing Sheets

METHOD FOR CALIBRATING A TORSION TORQUEMETER

BACKGROUND OF THE INVENTION

The present invention concerns devices for measuring the torque transmitted by an engine shaft, for example a shaft of an aircraft turbomachine.

The present invention more particularly concerns a method for calibrating a torsion torquemeter preferably intended to be mounted in a helicopter turbomachine.

It is to be recalled that measurement of the rotational torque of a shaft is of particular importance in the field of helicopter engines since it generally provides one of the essential piloting data items taken into account by a pilot. Once the rotor of a helicopter has reached constant speed, the power supplied by the latter is exclusively dependent on torque.

Document FR 2 931 552 describes a torquemeter based on the measurement of torsional deformation of the shaft, this deformation in particular being a function of the transmitted torque.

The torsion torquemeter described in this document comprises:
  a power shaft intended to transmit rotational torque about an axis, said power shaft being provided with a first wheel carrying a first and second series of angular reference points;
  a reference shaft having a first end fastened to one end of the power shaft and a second end provided with a second wheel carrying third and fourth series of angular reference points, the angular reference points of the first and third series being parallel to one another, whilst the angular reference points of the second and fourth series are parallel to each other whilst being inclined relative to the reference points of the first and third series;
  a measuring device to measure a first angular offset between two angular reference points respectively belonging to the first and third series of angular reference points, and a second angular offset between two angular reference points respectively belonging to the second and fourth series of angular reference points;
  a calculation unit to determine a value of the torque output by the power shaft, based in particular on the first and second angular offsets measured by the measuring device.

To calculate the torque supplied by the power shaft, the calculation unit must previously determine the temperature of the shaft using data provided by the measuring device. Once the temperature has been determined, the torque value is determined using a database previously stored in a memory of the calculation unit, this database containing torque values corresponding to several values of angle deformation for different temperatures.

The prior art torsion torquemeter therefore requires knowledge of the temperature of the power shaft, and of a behavioural model of the material of the power shaft.

OBJECTIVE AND SUMMARY OF THE INVENTION

It is one objective of the present invention to propose a method for calibrating a torsion torquemeter of the aforementioned type so that the calibrated torquemeter is able to compute the torque without having to determine the temperature of the power shaft.

According to the method subject of the invention:
  the torsion torquemeter is placed in a first state in which the value of the torque output by the power shaft lies within a first predetermined torque range, the shafts of the torsion torquemeter then being at a first temperature;
  a first set of measurements is performed whereby the first and second angular offsets are determined, and the torque output by the power shaft is measured using a reference torquemeter;
  the torsion torquemeter is placed in a second state in which the value of the torque output by the power shaft lies within a second predetermined torque range, the second predetermined torque range differing from the first predetermined torque range, the shafts of the torsion torquemeter then being substantially at the first temperature;
  a second set of measurements is performed whereby the first and second angular offsets are determined, and the torque output by the power shaft is determined using the reference torquemeter;
  the torquemeter is placed in a third state whereby the value of the torque output by the power shaft lies within the second predetermined torque range, the shafts of the torsion torquemeter being brought to a second temperature different from the first temperature;
  a third set of measurements is performed whereby the first and second angular offsets are determined, and the torque deliver by the power shaft is measured using the reference torquemeter;
  the torquemeter is placed in a fourth state whereby the value of the torque output by the power shaft lies within the first predetermined torque range, whilst the shafts of the torsion torquemeter are substantially at the second temperature;
  a fourth set of measurements is performed whereby the first and second angular offsets are determined, and the torque output by the power shaft is measured using the reference torquemeter;
  the calculation unit is calibrated from the first, second, third and fourth sets of measurements.

The first, second, third and fourth sets of measurements allow determination of calibration data, which are subsequently used by the calculation unit to compute the torque value such as measured by the torsion torquemeter.

Once calibrated, the calculation unit of the torsion torquemeter determines the value of the torque from the first and second angular offsets and from the calibration data.

The calibration method is particularly quick and easy to perform since it only requires four sets of measurements and two temperature-stabilized torque values. Said calibration can be carried out in less than 30 minutes by an experienced operator.

In addition, the calibration method of the invention is preferably implemented when the torquemeter is mounted in the turbomachine. Calibration can therefore easily be conducted on a test bench without dismounting the turbomachine.

It was additionally found that a torquemeter calibrated by implementing the method of the invention has better precision than the prior art torquemeter. In practice, the precision obtained is only very slightly below the precision of the reference torquemeter used for calibration.

Once calibrated, the torsion torquemeter is capable of providing a precise torque value without it being necessary to determine the temperature of the power shaft. As a result, it is no longer necessary to have knowledge of the behavioural model of the material of the power shaft as a function of temperature in order to be able to calculate the torque transmitted by the power shaft.

According to one preferred embodiment, the second predetermined torque range is higher than the first predetermined torque range, whilst the second temperature value is higher than the first temperature value.

Therefore, preferably, the second set of measurements is conducted substantially at the same temperature as the first set of measurements. The third set of measurements is conducted within the same range as the second set of measurements. The fourth set of measurements is conducted substantially at the same temperature as the third set of measurements and within the same torque range as the first set of measurements.

By "substantially" is preferably meant a tolerance of plus or minus 5 to 20%.

Preferably, the second set of measurements is performed soon after the first set of measurements e.g. less than one minute after the first set of measurements so that the temperature of the shafts, via thermal inertia, does not have the time to increase further to an increase in torque. The increase in torque, between the first and second predetermined torque values, is obtained by increasing the speed of the turbomachine which causes heating thereof and hence a rise in temperature of the shafts.

Similarly, the fourth set of measurements is performed soon after the third set of measurements e.g. less than one minute after the third set of measurements so that the temperature of the shafts, via thermal inertia, does not have the time to decrease further to a decrease in torque.

Also, the first predetermined torque range is preferably but not exclusively in the region of a first mean torque value of between 0 and 20% of the maximum torque that the turbomachine equipped with the torsion torquemeter is able to produce.

The second predetermined torque range is preferably but not exclusively in the region of a second mean torque value which is higher than 80% of said maximum torque.

As non-limiting example, the extent of the first torque range corresponds to the first mean value plus or minus 10%. Similarly, as non-limiting example, the extent of the second torque range corresponds to the second mean value plus or minus 10%.

To improve on the precision of calibration, it is waited until the temperature of the shafts of the torquemeter is stabilized at the second temperature value before conducting the third set of measurements.

The inventors have ascertained that a time of about 15 minutes could prove to be sufficient for the temperature of the shafts to stabilize at the second temperature value.

Advantageously, the first, second, third and fourth sets of measurements are used to determine calibration data which are stored in a memory of the calculation unit.

This is preferably a re-write memory so that, if necessary, several calibrations of the torsion torquemeter can be performed throughout the lifetime of the turbomachine.

Advantageously, the first and second wheels are phonic wheels, and the angular reference points are teeth.

In addition, the measurement device is preferably formed by a single magnetic sensor.

The invention also relates to a calibrated torsion torquemeter comprising:
- a power shaft intended to transmit rotational torque about an axis, said power shaft being equipped with a first wheel carrying a first and second series of angle reference points;
- a reference shaft having a first end attached to one end of the power shaft and a second end provided with a second wheel carrying third and fourth angular reference points, the angular reference points of the first and third series being parallel to each other, whilst the angular reference points of the second and fourth series are parallel to one another whilst being inclined relative to the reference points of the first and third series;
- a measuring device to measure a first angular offset between two reference points respectively belonging to the first and third series of angular reference points, and a second angular offset between two reference points respectively belonging to the second and fourth series of angular reference points;
- a calculation unit to determine a torque value output by the power shaft on the basis of the first and second angular offsets measured by the measuring device, the calculation unit comprising a memory to store calibration data obtained by implementing the method of the invention, the torque value such as determined by the calculation unit being a function of the first and second angular offsets and of said calibration data.

Finally, the present invention pertains to a turbomachine comprising a torsion torquemeter calibrated according to the invention.

BRIEF DESCRIPTION OF THE DRAWINGS

The invention will be better understood on reading the following description of one embodiment of the invention given as a non-limiting example, with reference to the appended drawings in which.

DETAILED DESCRIPTION OF THE INVENTION

Figure 1:
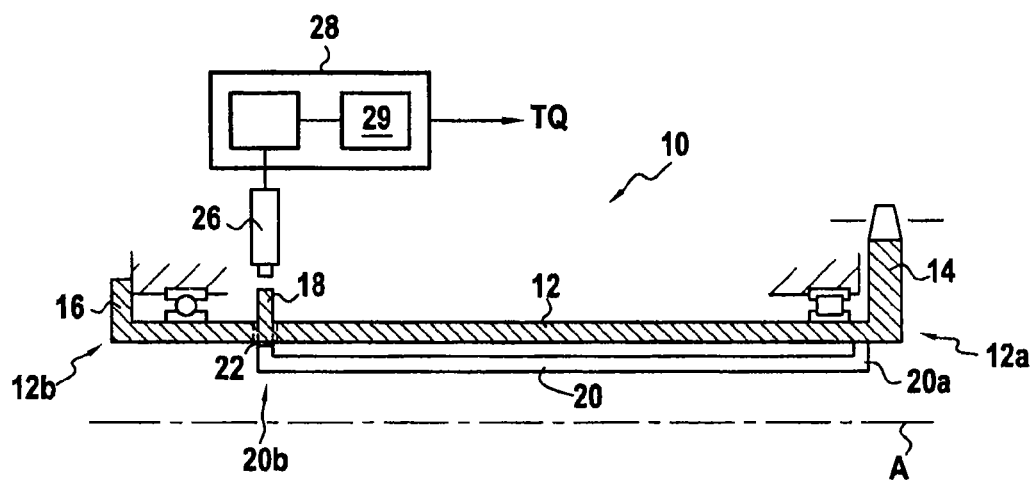
FIG. 1 is a half axial section view of a torsion torquemeter calibrated according to the invention.

FIG. 1 illustrates one preferred embodiment of the torsion torquemeter 10 which is intended to be calibrated by implementing the method of the invention.

The torsion torquemeter 10 comprises a hollow power shaft 12 intended to transmit rotational torque about its axis A. It is this torque that it is sought to measure.

In the example in FIG. 1, the power shaft 12 comprises a pinion 14 at its first end 12a, and a driving member 16 arranged at its second end 12b opposite the first end. Evidently it is possible for the ends of the power shaft to be differently equipped.

Also, the power shaft 12, close to its second end 12b, carries a first wheel, here a phonic wheel 18, which is coaxial and comprises a plurality of angular reference points, in this case teeth.

The torsion torquemeter 10 further comprises a reference shaft 20 extending axially inside the power shaft 12 to which it is attached via its first end 20a close to the first end 12a of the power shaft 12, whilst its second end 20b is free. The second end 20b of the reference shaft 20, opposite its first end 20a, carries a second wheel, here of phonic type 22, which is concentric with the first phonic wheel 18. The second phonic wheel 22 carries a plurality of angular reference points, in this case teeth, which extend radially through openings made in the power shaft 20. An alternative configuration is described in FR 2 931 552.

Facing the first and second phonic wheels 18,22 there is arranged a single magnetic sensor 26 which is capable of generating an electric signal on each passing of a tooth in front of it, said signal then being sent to a calculation unit 28 intended to determine the value of the torque transmitted by the power shaft 12.

The first phonic wheel 18 comprises a first and second series of angular reference points, namely a first series of teeth D1 identical to each other, and a second series of teeth D2 identical to each other, whilst the second phonic wheel 22 comprises a third series of teeth D3 identical to each other and a fourth series of teeth D4 identical to each other.

The first and second phonic wheels are arranged such that the teeth D1,D2 of the first phonic wheel 18 angularly alternate with the teeth D3, D4 of the second phonic wheel 22.

Figure 2:
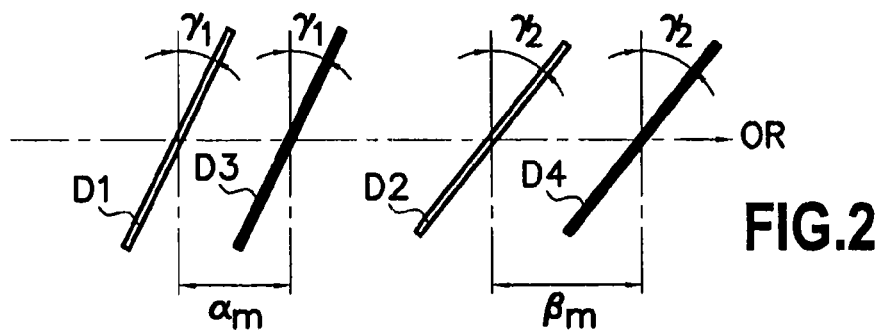
FIG. 2 shows the relative position of the teeth of the first and second phonic wheels of the torquemeter in FIG. 1, and illustrates the first and second angular offsets measured by the sensor of the torquemeter in FIG. 1.

As can be seen in FIG. 2, the teeth D1, D3 of the first and third series are parallel to each other, whilst the teeth D2, D4 of the second and fourth series are parallel to one another whilst being inclined relative to the teeth of the first and third series.

In this FIG. 2, the distribution of the teeth is illustrated in an orthoradial direction OR of the power shaft. It will therefore be understood that the white teeth D1 and D2 belong to the first phonic wheel, whilst the black teeth belong to the second phonic wheel.

The teeth D1 and D3 lie at an angle γ1 relative to the axial direction of the power shaft, whilst the teeth D2 and D4 lie at angle γ2 different from γ1.

The magnetic sensor 26 is a measuring device which allows the determining of a first angular offset $\alpha_m$ between two teeth D1, D3 respectively belonging to the first series of teeth and the second series of teeth. The magnetic sensor 26 also allows the measurement of a second angular offset $\beta_m$ between two teeth D2, D4 respectively belonging to the second series of teeth and the fourth series of teeth.

The calculation unit 28 of the torsion torquemeter 10 is programmed to compute a torque value TQ from the first and second angular offsets $\alpha_m$ and $\beta_m$ measured by the magnetic sensor 26 and from calibration data stored in a memory 29 of the calculation unit 28.

The torque value TQ is obtained for example, but not exclusively, using the following mathematical formula.

$$TQ(\alpha_m, \beta_m) = \frac{\beta_m - \beta_{off} + [(\beta_m - \beta_{off}) - (\alpha_m - \alpha_{off})] * \frac{TQ0_\beta}{TQ0_\alpha - TQ0_\beta}}{R_0 + [(\beta_m - \beta_{off}) - \alpha_m - \alpha_{off})] * \frac{1}{TQ0_\alpha - TQ0_\beta}} \quad (1)$$

Where:
$\alpha_m$ and $\beta_m$ represent the first and second angular offsets measured by the sensor;
$R_0$, $\alpha_{off}$, $\beta_{off}$, $TQ0_\alpha$ and $TQ0_\beta$ are the calibration data.
This formula is stored in a processor of the calculation unit.

The calibration data $R_0$, $\alpha_{off}$, $\beta_{off}$, $TQ0_\alpha$ and $TQ0_\beta$ are obtained on completion of the calibration method of the invention which will now be described with reference to FIGS. 3 and 4.

It is therefore appreciated that the torsion torquemeter is fully characterized once the calibration data $R_0$, $\alpha_{off}$, $\beta_{off}$, $TQ0_\alpha$ and $TQ0_\beta$ are known. Therefore the object of calibration is to compute the values $R_0$, $\alpha_{off}$, $\beta_{off}$, $TQ0_\alpha$ and $TQ0_\beta$.

Figure 3:
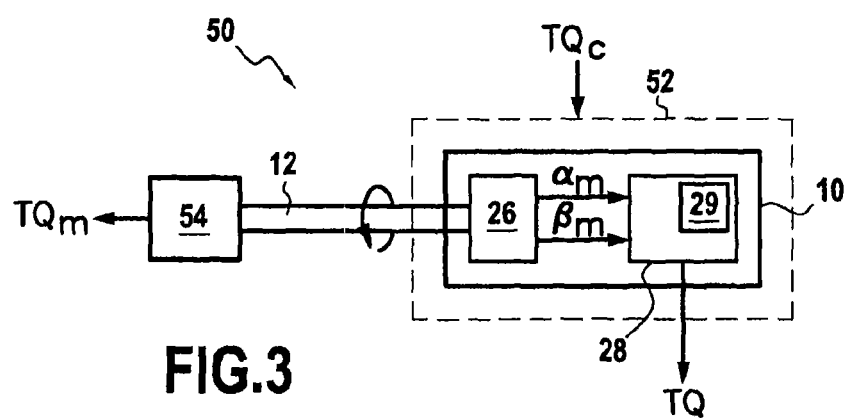
FIG. 3 illustrates the installation for implementing the calibration method of the invention.

FIG. 3 illustrates the installation to implement the calibration method of the invention. In this case it is a calibration bench 50.

The torsion torquemeter 10 when calibrated is mounted in a turbomachine 52, this engine being arranged on the calibration bench 50.

The end of the power shaft 12 is attached to a reference torquemeter 54 external to the turbomachine 52.

The reference torquemeter 54 therefore provides a reference measurement $TQ_m$ of the torque output by the power shaft 12 when a set torque $TQ_c$ is requested of the turbomachine. It will be understood that if the torquemeter is not calibrated, the value $TQ_m$ does not exactly correspond to the set value $TQ_c$.

Figure 4:
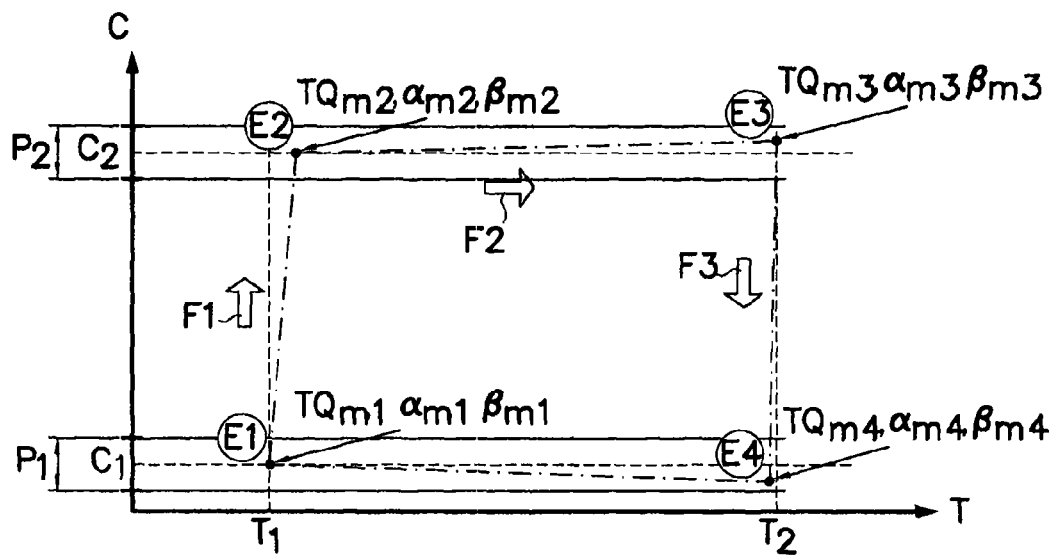
FIG. 4 illustrates the steps of the calibration method according to the invention.

With reference now to FIG. 4, a detailed explanation will be given of the implementation of the method of the invention.

First the torsion torquemeter is placed in a first state E1 in which the value of the torque output by the power shaft 12 lies within a first predetermined torque range P1 substantially centred around a first mean torque value C1. In this first state E1, the power and reference shafts of the torsion torquemeter are at a first temperature T1. In this non-limiting example, the first mean torque value C1 is equal to 10% of the maximum torque which the turbomachine is able to produce, whilst the first temperature is about 80° C. The limits of the first range in this example are plus or minus about 10% of the first mean torque value.

When the torquemeter is in the first state E1, a first set of measurements is performed in which the first and second angular offsets $\alpha_{m1}$ and $\beta_{m1}$ are determined by means of the magnetic sensor 26, and the torque $TQ_{m1}$ output by the power shaft is measured using the reference torquemeter 54.

The speed rate of the turbomachine is increased by increasing the set value $TQ_c$ so as to place the torquemeter in a second state E2 (arrow F1) in which the value of the torque output by the power shaft 12 lies within a second predetermined torque range P2 substantially centred around a second mean torque value C2 higher than the first mean torque value C1. A second set of measurements is then rapidly performed whereby the first and second angular offsets $\alpha_{m2}$ and $\beta_{m2}$ are determined using the magnetic sensor 26, and the torque $TQ_{m2}$ output by the power shaft is measured using the reference torquemeter 54. The second set of measurements is rapidly carried out so that in the second state the temperature of the shafts of the torsion torquemeter remains substantially equal to the first temperature T1.

In this example, the second mean value C2 is substantially equal to 80% of the maximum torque which the turbomachine is able to produce.

The limits of the second range in this example lie within about plus or minus 10% of the second mean torque value.

After completing the second set of measurements, it is waited until the engine heats so that the torsion torquemeter is brought to a third state E3 (arrow F2) wherein the shafts of the torsion torquemeter are at a second temperature T2 higher than temperature T1, whilst the value of the torque output by the power shaft 12 remains within the second torque range. In other words, the torque value remains substantially equal to the second mean torque value C2.

After waiting a few minutes for the shafts of the torsion torquemeter 10 to stabilize at the second temperature T2, a third set of measurements is performed whereby the first and second angular offsets $\alpha_{m3}$ and $\beta_{m3}$ are determined by means of the magnetic sensor, and the torque $TQ_{m3}$ output by the power shaft is measured using the reference torquemeter 54.

The speed of the turbomachine is then reduced so as to bring the torquemeter to a fourth state E4 (arrow F3) wherein the value of the torque output by the power shaft 12 lies within the first torque range P1. The value of the torque is substantially equal to the first mean torque value C1, whilst the shafts of the torquemeter are still substantially at the second temperature T2.

When the torquemeter is placed in this fourth state, a fourth set of measurements is performed whereby the first and second angular offsets $\alpha_{m4}$ and $\beta_{m4}$ are determined by means of the magnetic sensor, and the torque $TQ_{m4}$ output by the power shaft is measured using the reference torquemeter 54. The fourth set of measurements is performed soon after the first predetermined torque range P1 has been reached so that the temperature of the shafts remains substantially equal to the second temperature T2.

Evidently, the cycle presented herein is not limiting and it could be conducted in reverse order or in a different order provided that four sets of measurements are performed allowing the calibration data to be calculated.

The torsion torquemeter, more specifically the calculation unit, is then calibrated using the first, second, third and fourth sets of measurements.

In other words, the aforementioned calibration data are determined on the basis of the first, second, third and fourth sets of measurements.

For example:

$$R_0 = \frac{\beta_{m2} - \beta_{m1}}{TQ_{m2} - TQ_{m1}}$$

After which the angular offsets are calculated:

$$\beta_{off} = \beta_{m2} - TQ_{m2} * R_0$$

$$\alpha_{off} = \alpha_{m2} - TQ_{m2} * R_0$$

$$\frac{TQ0_\beta}{TQ0_\alpha - TQ0_\beta} = \frac{B * TQ_{m4} - A * TQ_{m3}}{TQ_{m3} - TQ_{m4}}$$

$$\frac{1}{TQ0_\alpha - TQ0_\beta} = \frac{B - A}{TQ_{m3} - TQ_{m4}}$$

Where:

$$A = \frac{\beta_4 - TQ_{m4} * R_0}{\beta_4 - \alpha_4}$$

$$B = \frac{\beta_3 - TQ_{m3} * R_0}{\beta_3 - \alpha_3}$$

These calibration data are then stored in the memory 29 of the calculation unit 28 so that they can be used by the calculation unit to calculate the torque value TQ, using formula (1) given above.

Figure 5:
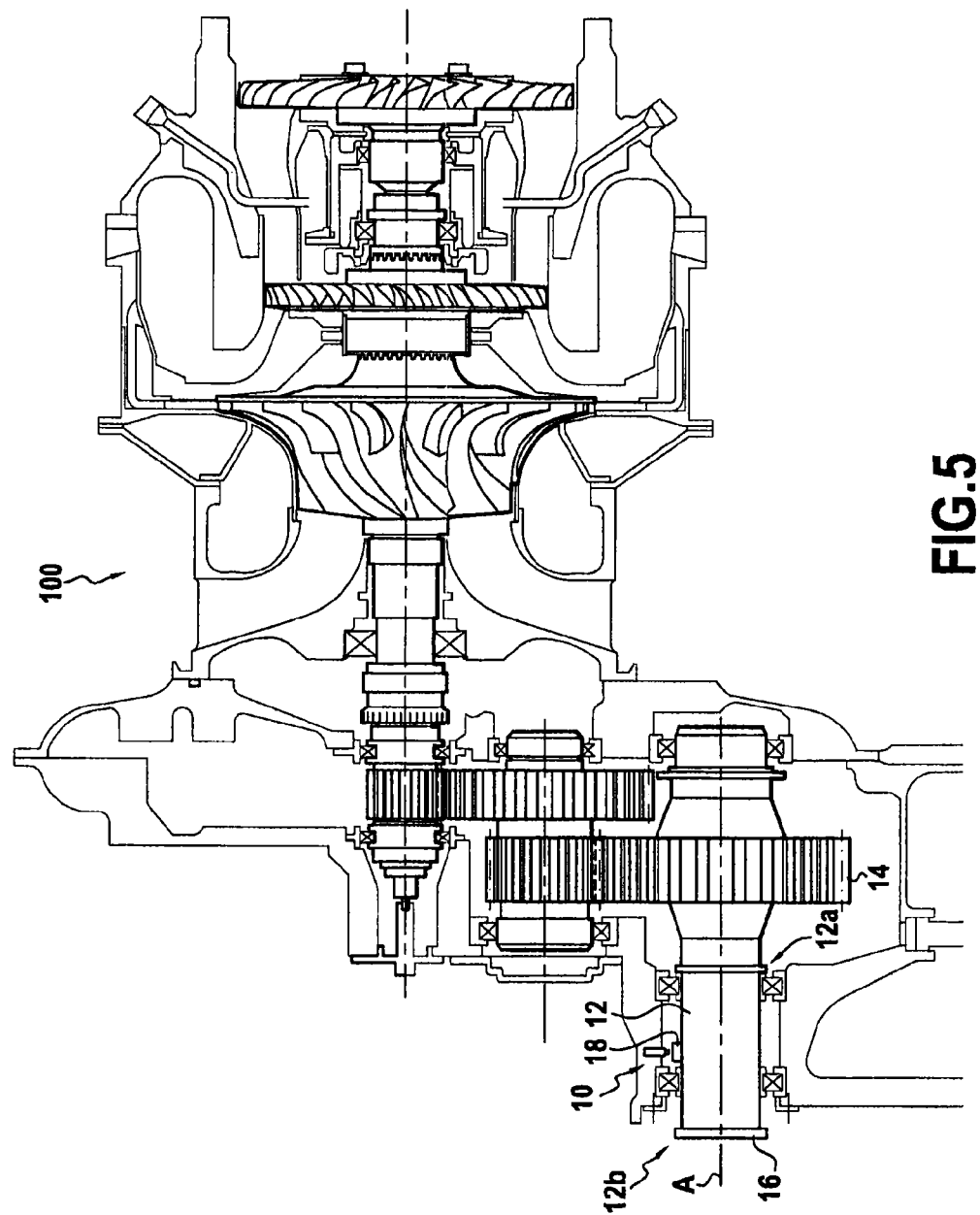
FIG. 5 illustrates a turbomachine equipped with the torsion torquemeter calibrated by implementing the method of the invention.

In FIG. 5, a turbomachine 100 is illustrated equipped with a torsion torquemeter 10 calibrated using the method of the invention.

The invention claimed is:

1. A method for calibrating a torsion torquemeter including:
    a power shaft configured to transmit rotational torque about an axis, the power shaft including a first wheel carrying a first and second series of angular reference points;
    a reference shaft including a first end attached to one end of the power shaft and a second end including a second wheel carrying a third and fourth series of angular reference points, the angular reference points of the first and third series being parallel to each other, and the angular reference points of the second and fourth series being parallel to one another while being inclined relative to the reference points of the first and third series;
    a measuring device to measure a first angular offset between two reference points respectively belonging to the first and third series of angular reference points, and a second angular offset between two reference points respectively belonging to the second and fourth series of angular reference points;
    a calculation unit to determine a torque value output by the power shaft on the basis of the first and second angular offsets measured by the measuring device;
    the method comprising:
    placing the torsion torquemeter in a first state whereby a value of torque output by the power shaft lies within a first predetermined torque range, shafts of the torsion torquemeter then being at a first temperature;
    performing a first set of measurements whereby first and second angular offsets are determined, and the torque output by the power shaft is measured by a reference torquemeter;
    placing the torsion torquemeter in a second state whereby a value of the torque output by the power shaft lies within a second predetermined torque range, the second predetermined torque range differing from the first predetermined torque range, the shafts of the torsion torquemeter then being substantially at the first temperature;
    performing a second set of measurements whereby the first and second angular offsets are determined, and the torque output by the power shaft is measured using the reference torquemeter;
    placing the torquemeter in a third state whereby the value of the torque output by the power shaft lies within the second predetermined torque range, the shafts of the torsion torquemeter being brought to a second temperature different from the first temperature;
    performing a third set of measurements whereby the first and second angular offsets are determined, and the torque output by the power shaft is measured using the reference torquemeter;
    placing the torquemeter in a fourth state whereby the value of the torque output by the power shaft lies within the first predetermined torque range, whilst the shafts of the torsion torquemeter are substantially at the second temperature;
    performing a fourth set of measurements whereby the first and second angular offsets are determined, and the torque output by the power shaft is measured using the reference torquemeter;
    calibrating the calculation unit based on the first, second, third, and fourth sets of measurements.

2. A method for calibrating a torsion torquemeter according to claim 1, wherein the second predetermined torque range is higher than the first predetermined torque range, and the second temperature is higher than the first temperature.

3. The method for calibrating a torsion torquemeter according to claim 1, wherein it is waited until a temperature of the shafts of the torquemeter has stabilized at the second temperature before performing the third set of measurements.

4. The method for calibrating a torsion torquemeter according to claim 1, wherein the first, second, third, and fourth sets of measurements are used to determine calibration data stored in a memory of the calculation unit.

5. The method for calibrating a torsion torquemeter according to claim 1, wherein the torsion torquemeter is mounted in a turbomachine and the reference torquemeter is arranged outside the turbomachine.

6. The method for calibrating a torsion torquemeter according to claim 1, wherein the first and second wheels are phonic wheels, and wherein the angular reference points are teeth.

7. The method for calibrating a torsion torquemeter according to claim 1, wherein the measuring device is formed by a single magnetic sensor.

8. A calibrated torsion torquemeter comprising:
   a power shaft configured to transmit rotational torque about an axis, the power shaft including a first wheel carrying a first and second series of angular reference points;
   a reference shaft including a first end attached to one end of the power shaft and a second end including a second wheel carrying a third and fourth series of angular reference points, the angular reference points of the first and third series lying parallel to each other, and the angular reference points of the second and fourth series are parallel to one another while being inclined relative to the reference points of the first and third series;
   a measuring device to measure a first angular offset between two reference points respectively belonging to the first and third series of angular reference points, and a second angular offset between two reference points respectively belonging to the second and fourth series of angular reference points;
   a calculation unit to determine a torque value output by the power shaft based on the first and second angular offsets measured by the measuring device, the calculation unit comprising a memory to store calibration data obtained by implementing the method according to claim 1, and the torque value such as determined by the calculation unit being a function of the first and second angular offsets and of the calibration data.

9. A turbomachine comprising a torsion torquemeter calibrated according to claim 8.

* * * * *